(12) United States Patent
S et al.

(10) Patent No.: US 12,361,820 B2
(45) Date of Patent: Jul. 15, 2025

(54) SYSTEM AND METHOD FOR ADAPTIVE POWER MANAGEMENT IN WIRELESS SENSOR COMMUNICATION (71) Applicant: Honeywell International Inc., Charlotte, NC (US)

(72) Inventors: Ruban S, Tamilnadu (IN); Balamurugan Ganesan, Bengaluru (IN); Eldhose K. George, Kerala (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 95 days.

(21) Appl. No.: 18/490,546

(22) Filed: Oct. 19, 2023

(65) Prior Publication Data

US 2025/0131816 A1  Apr. 24, 2025

(51) Int. Cl.
*G08B 29/20* (2006.01)
*H04W 52/36* (2009.01)

(52) U.S. Cl.
CPC .......... *G08B 29/20* (2013.01); *H04W 52/367* (2013.01)

(58) Field of Classification Search
None
See application file for complete search history.

(56) References Cited

U.S. PATENT DOCUMENTS 6,256,476 B1 * 7/2001 Beamish ............. H04W 52/283
455/574
6,727,816 B1 4/2004 Helgeson
7,283,792 B2 * 10/2007 Chmiel ............... H04W 52/288
455/67.11

(Continued)

FOREIGN PATENT DOCUMENTS

CN 108966249 A 12/2018
EP 0874341 A2 10/1998
EP 3070980 A1 9/2016

OTHER PUBLICATIONS

Pal, "Transmit Power Reduction ≠ Proportional Power Savings: Applicability of Transmit Power Control in Large-Scale Wireless Sensor Networks," IEEE Internet of Things Magazine, 5 pages, Mar. 2020. Downloaded on Aug. 24, 2020.

(Continued)

*Primary Examiner* — Fekadeselassie Girma
(74) *Attorney, Agent, or Firm* — Seager, Tufte & Wickhem, LLP (57) ABSTRACT While in a walk-test mode, a battery powered wireless sensor transmits a plurality of wireless communication signals each at a different transmit power level, and for each of the plurality of wireless communication signals, listens for a corresponding wireless acknowledgement signal. A security panel listens for the plurality of wireless communication signals transmitted by the battery powered wireless sensor, attenuates the plurality of wireless communication signals by a predetermined margin, and transmits a wireless acknowledgement signal to the battery powered wireless sensor for those attenuated wireless communication signals that are received and recognized by the security panel. The battery powered wireless sensor determines a minimum transmit power level based at least in part upon the wireless acknowledgement signals from the security panel.

19 Claims, 8 Drawing Sheets

(56) References Cited

U.S. PATENT DOCUMENTS

| | | | |
|---|---|---|---|
| 10,117,191 B2* | 10/2018 | Egan | H04B 17/318 |
| 10,667,220 B2* | 5/2020 | Goli | H04W 52/245 |
| 11,690,538 B2* | 7/2023 | Hernandez-Rosas | A61B 5/14546 600/365 |
| 2004/0203984 A1* | 10/2004 | Yang | H04W 52/52 455/522 |
| 2007/0013481 A1* | 1/2007 | Zhu | G06K 19/0712 340/10.1 |
| 2011/0111700 A1 | 5/2011 | Hackett | |
| 2013/0329631 A1* | 12/2013 | Alam | H04W 52/50 370/328 |
| 2020/0314744 A1 | 10/2020 | Bhanja et al. | |
| 2020/0336991 A1* | 10/2020 | Bhutani | H04W 52/288 |
| 2023/0077097 A1* | 3/2023 | Gorectke | H04W 52/48 |
| 2023/0100826 A1* | 3/2023 | Newman | H04W 64/00 455/522 |
| 2024/0056985 A1* | 2/2024 | Lee | H04W 72/25 |
| 2024/0267905 A1* | 8/2024 | Robin | H04W 8/005 |
| 2024/0381393 A1* | 11/2024 | Cozzo | H04W 72/40 |

OTHER PUBLICATIONS

Jing Li, et al., "ThermoNet: Fine-Grain Assessment of Building Comfort and Efficiency," Procedia Computer Science, vol. 10, Aug. 10, 2022, pp. 349-356.

Extended European Search Report, EP Application No. 24202246.5, European Patent Office, Mar. 17, 2025 (12 pages).

* cited by examiner

SYSTEM AND METHOD FOR ADAPTIVE POWER MANAGEMENT IN WIRELESS SENSOR COMMUNICATION

TECHNICAL FIELD

The present disclosure relates generally to security systems employing wireless sensors and more particularly to power management for wireless sensor communication in security systems.

BACKGROUND

A variety of different systems employ sensors. An example includes a security system. A security system may include a large number of sensors such as door sensors, window sensors, glass break sensors, motion sensors and others. Many sensors are placed in positions that are not amenable to hard-wiring, meaning that some of the sensors are often not only wireless sensors but also battery powered sensors. Typically, the sensors communicate with a security panel. Many battery powered wireless sensors are able to adjust the power by which they transmit messages. It will be appreciated that the power necessary for reliable communication can vary for each sensor, and may vary in accordance with things like distance between the sensor and the security panel, interference with other electronic devices, materials in or around that sensor and/or security panel including materials in and around the walls and ceilings, and other factors. Also, the necessary power level for reliable communication may vary on a temporal basis caused by, for example, temporal changes in the environment.

Transmitting at a power level that is higher than necessary for reliable communication wastes electrical power, meaning that batteries of a battery power wireless sensor may be consumed faster than necessary. Moreover, when a battery powered wireless sensor transmits at a higher than necessary level, those messages travel farther than necessary, and may cause unnecessary traffic, noise and/or interference for other devices in the system. This can lead to an increase in signal collisions, which can result in multiple messages not reaching their desired destinations. What would be desirable are methods and systems for adjusting communication power levels in a battery powered wireless sensor in order to improve battery life while allowing the battery powered wireless sensors to communicate effectively within a security system.

SUMMARY

The present disclosure relates generally to security systems employing wireless sensors and more particularly to power management for wireless sensor communication in security systems. An example may be found in a method for configuring a transmit power level of a battery powered wireless sensor of a security system. The method includes entering a walk-test mode for at least part of the security system. Once in the walk-test mode, the battery powered wireless sensor transmits a plurality of wireless communication signals each at a different transmit power level, and for each of the plurality of wireless communication signals, listens for a corresponding wireless acknowledgement signal. In the walk-test mode, a security panel of the security system listens for the plurality of wireless communication signals transmitted by the battery powered wireless sensor, attenuates the plurality of wireless communication signals by a predetermined margin, and transmits a wireless acknowledgement signal to the battery powered wireless sensor for those attenuated wireless communication signals that are received and recognized by the security panel. The battery powered wireless sensor determines a minimum transmit power level based at least in part on which of the plurality of wireless communication signals that were transmitted by the battery powered wireless sensor at the different transmit power level resulted in a corresponding wireless acknowledgement signal from the security panel, and which of the plurality of wireless communication signals did not result in a corresponding wireless acknowledgement signal. The method includes exiting the walk-test mode and entering an operational mode. Once in the operational mode, the battery powered wireless sensor transmits wireless communication signals to the security panel using the determined minimum transmit power level and the security panel of the security system no longer attenuates the wireless communication signals transmitted by the battery powered wireless sensor.

Another example may be found in a method for operating a security system that includes a battery powered wireless sensor in communication with a security panel. The battery powered wireless sensor senses for a sensed event, and when sensed, wirelessly communicates the sensed event via wireless communication signals to the security panel. The security system includes an armed state and a disarmed state. The method includes determining whether the security system is in the armed state or the disarmed state. A sensed event is sensed by the battery powered wireless sensor, and in response, the sensed event is wirelessly communicated via wireless communication signals to the security panel at a first power level when the security system is in the armed state and is wirelessly communicated via wireless communication signals to the security panel at a second power level when the security system is in the disarmed state, wherein the first power level is higher than the second power level.

Another example may be found in a method for operating a security system that includes a battery powered wireless sensor in communication with a security panel. The method includes the battery powered wireless sensor sensing a first sensed event, and in response, wirelessly communicating the first sensed event to the security panel via wireless communication signals that are at a first power level. The battery powered wireless sensor repeatedly wirelessly transmits a supervisory signal to the security panel at a regular interval at a second power level that is lower than the first power level, and the security panel responds to each of the supervisory signals that are received and recognized by the security panel by transmitting a corresponding acknowledgement signal.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Figure 1:
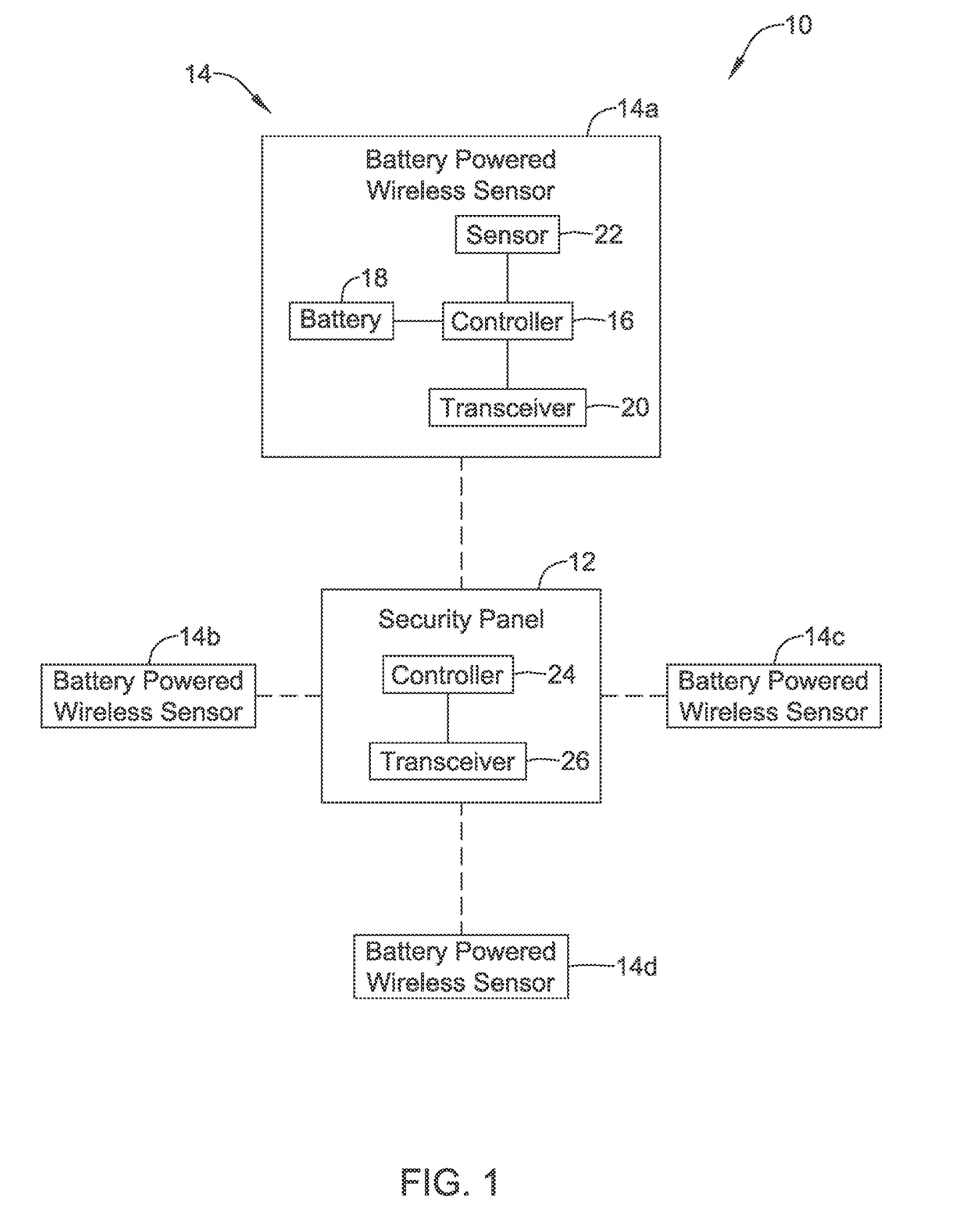
FIG. 1 is a schematic block diagram showing an illustrative security system including a plurality of wireless battery powered sensors.

FIG. 1 is a schematic block diagram showing an illustrative security system 10. While a security system 10 is used as an example, it is contemplated that the present disclosure may be applied to any suitable system such as an HVAC system with battery powered wireless HVAC sensors, an industrial process with battery powered wireless process sensors, and/or any other suitable process. The illustrative security system 10 of FIG. 1 includes a security panel 12.

The security system 10 may include a single security panel 12 that operates as a main security system controller for the security system 10, or may include a plurality of distributed security panels 12 (e.g. a plurality of zone security panels) each operatively coupled to a main security system controller. It is contemplated that the security system 10 may have any desired architecture as desired.

In FIG. 1, a plurality of battery powered wireless sensors 14, individually labeled as 14a, 14b, 14c and 14d, wirelessly communicate with the security panel 12. At least some of the battery powered wireless sensors 14 may individually be a door sensor, a window sensor, a glass break sensor, a motion sensor, a fire sensor, a smoke sensor, for example. In some instances, at least some of the battery powered wireless sensors 14 may individually be temperature sensors, humidity sensors or gas detection sensors such as carbon dioxide sensors, carbon monoxide sensors, TVOC (total volatile organic compounds). These are just examples.

Each of the battery powered wireless sensors 14 may be considered as including a controller 16 that is configured to operate the battery powered wireless sensor 14, a battery 18 that powers the battery powered wireless sensor 14, a transceiver 20 or separate transmitter and receiver for communicating with the security panel 12, and of course one or more sensors 22 that provide the battery powered wireless sensor 14 with its sensing capability. Each controller 16 is configured to be able to recognize whether the security panel 12 has sent an acknowledgement to each transmitted message, and to adjust the power level at which that battery powered wireless sensor 14 transmits messages to the security panel 12. The security panel 12 includes a controller 24 that is configured to send and receive messages via a transceiver 26.

Figure 2A:
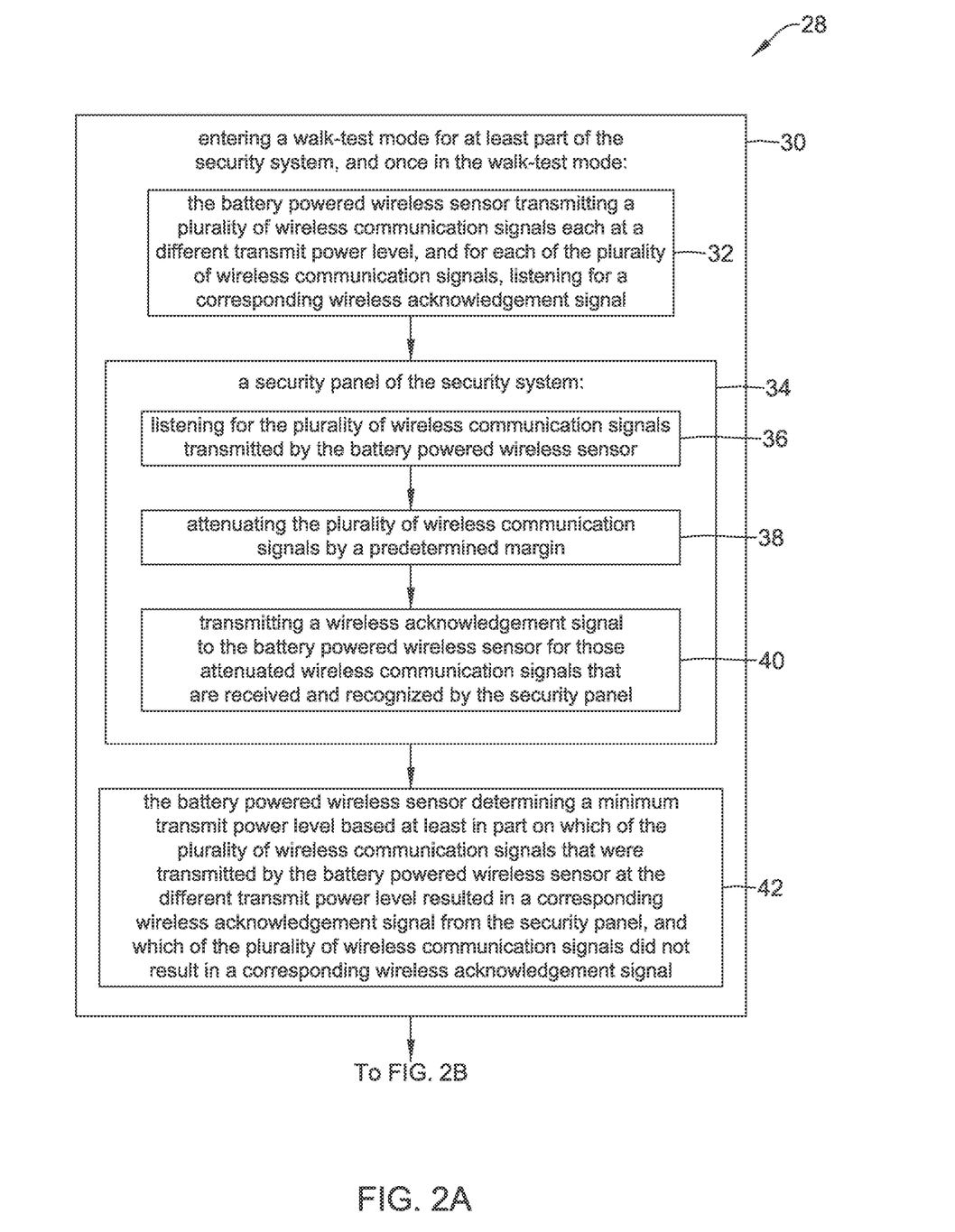
FIGS. 2A, 2B and 2C are flow diagrams that together show an illustrative method for configuring a transmit power level of a battery powered wireless sensor in a security system.
Figure 2B:
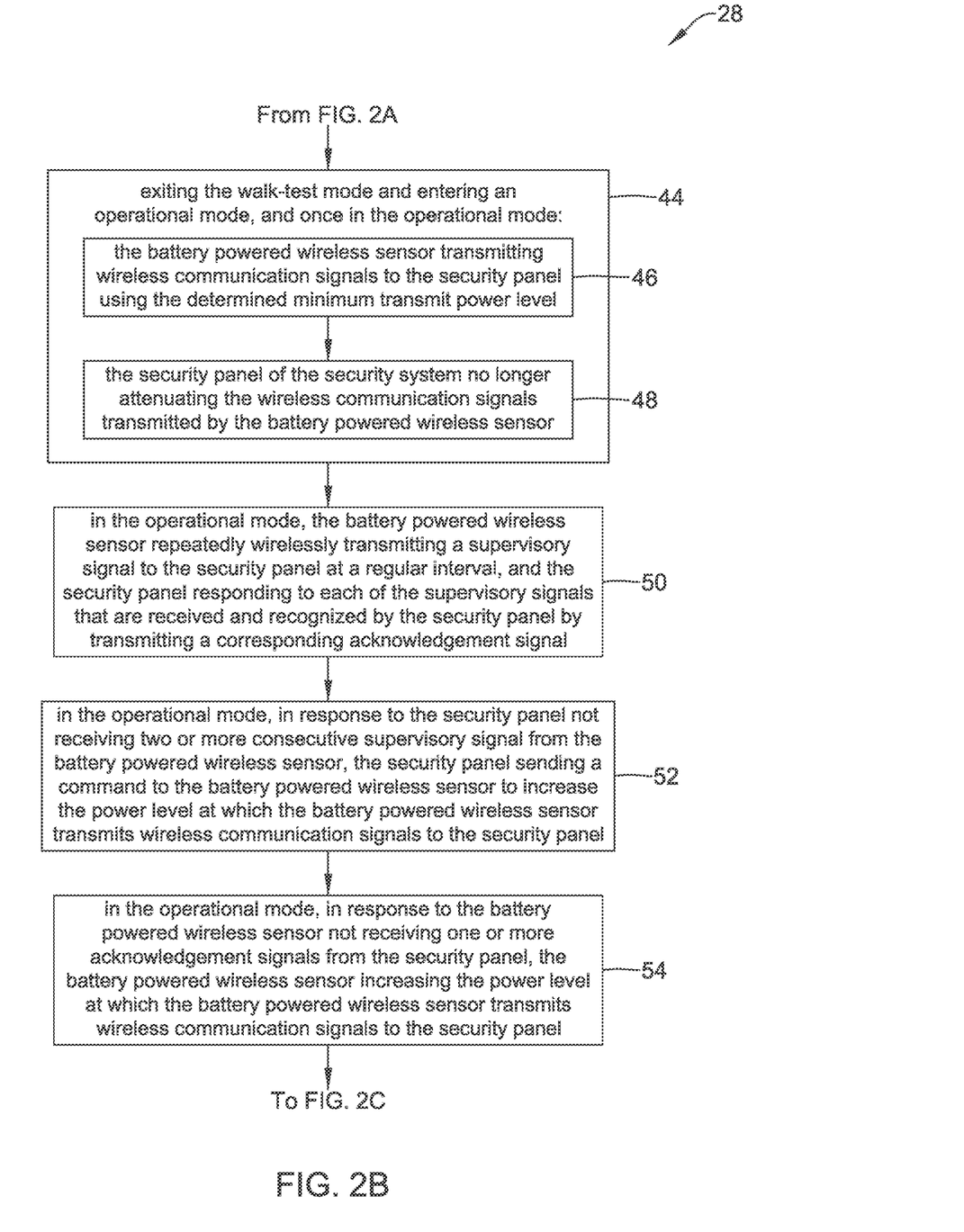
Figure 2C:
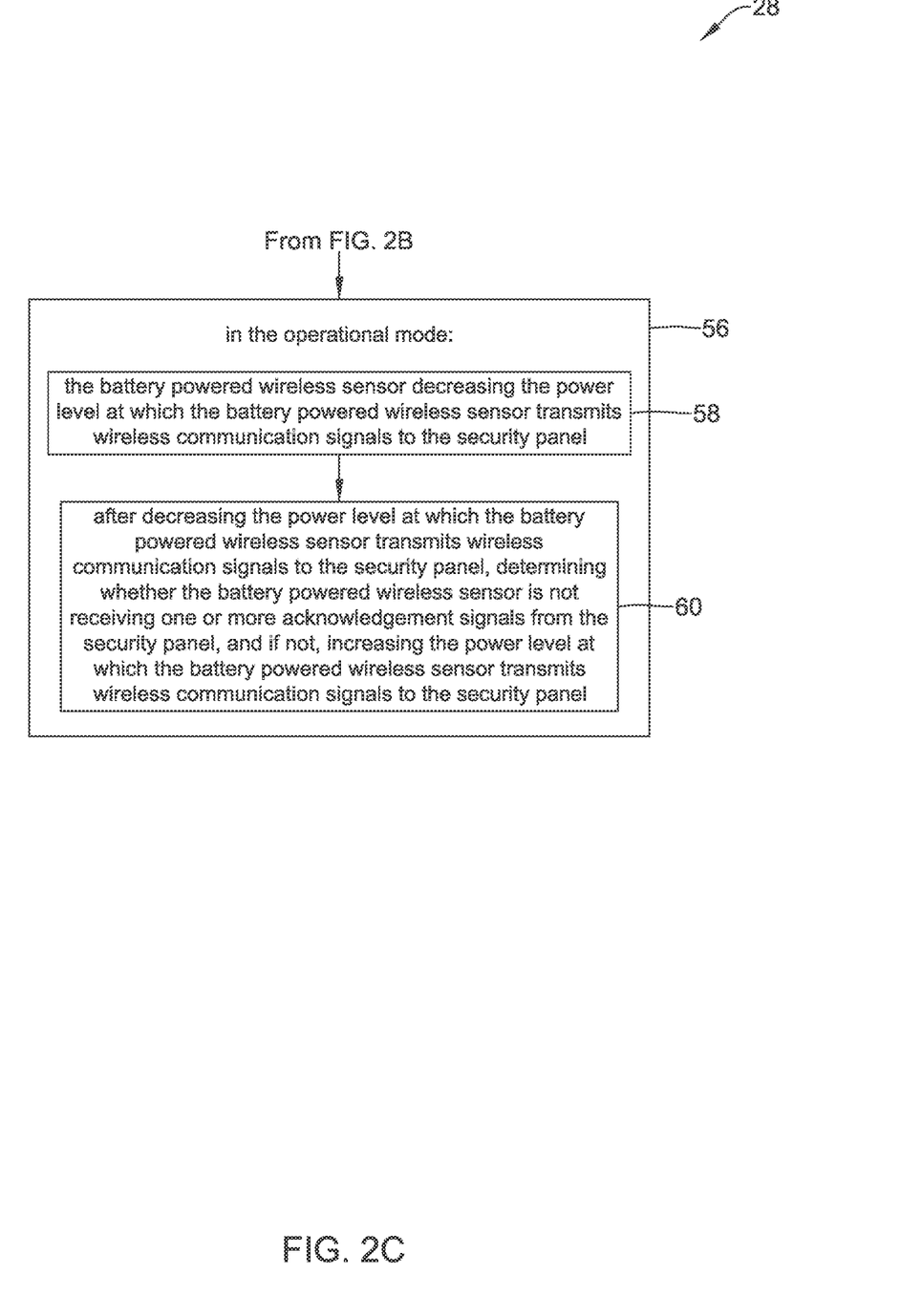

FIGS. 2A, 2B and 2C are flow diagrams that together show an illustrative method 28 for configuring a transmit power level of a battery powered wireless sensor (such as the battery powered wireless sensors 14) of a security system (such as the security system 10). The method 28 includes entering a walk-test mode for at least part of the security system, as indicated at block 30. In a walk-test mode, a technician typically walks around the area and checks that each of the sensors respond as intended at their mounted locations. For example, in the walk-test mode, a technician may walk to each motion sensor and checks to ensure each motion sensor respond properly to motion in the field of view of the motion sensor. The walk-test mode may be used to test sensors without causing alarms at a central monitoring station.

Once in the walk-test mode, the battery powered wireless sensor transmits a plurality of wireless communication signals each at a different transmit power level, and for each of the plurality of wireless communication signals, listens for a corresponding wireless acknowledgement signal (e.g. from the security panel 12), as indicated at block 32. While in the walk-test mode, a security panel (e.g. security panel 12) of the security system takes several actions, as indicated at block 34. The security panel listens for the plurality of wireless communication signals transmitted by the battery powered wireless sensor, as indicated at block 36.

While in the walk-test mode, the security panel of the security system attenuates the plurality of wireless communication signals by a predetermined margin (e.g. predetermined communication margin), as indicated at block 38. In some instances, attenuating the wireless communication signals transmitted by the battery powered wireless sensor by the predetermined margin may include activating a hardware attenuator of the security panel. In some instances, attenuating the wireless communication signals transmitted by the battery powered wireless sensor by the predetermined margin may include activating a software attenuator of the security panel. As an example, the predetermined margin may fall within a range of a 5 to 15 decibels attenuation.

While in the walk-test mode, the security panel of the security system transmits a wireless acknowledgement signal to the battery powered wireless sensor for those attenuated wireless communication signals that are received and recognized by the security panel, as indicated at block 40. For those attenuated wireless communication signals that do not have sufficient power (e.g. sufficient signal/noise ratio) at the security panel, and thus not able to be reliably received by the security panel, the security panel will not transmit a corresponding wireless acknowledgement signal. While still in the walk-test mode, the battery powered wireless sensor determines a minimum transmit power level based at least in part on which of the plurality of wireless communication signals that were transmitted by the battery powered wireless sensor at the different transmit power level resulted in a corresponding wireless acknowledgement signal from the security panel, and which of the plurality of wireless communication signals did not result in a corresponding wireless acknowledgement signal, as indicated at block 42.

Continuing on FIG. 2B, the method 28 includes exiting the walk-test mode and entering an operational mode, as indicated at block 44. Once in the operational mode, the battery powered wireless sensor transmits wireless communication signals to the security panel using the determined minimum transmit power level, as indicated at block 46. Once in the operational mode, the security panel of the security system no longer attenuates the wireless communication signals transmitted by the battery powered wireless sensor, as indicated at block 48. By no longer attenuating the wireless communication signals, the predetermined communication margin is established. The predetermined communication margin may be easily and reliably set by simply setting a suitable attenuation amount in the security panel (e.g. between 5 to 15 decibels attenuation).

In some instances, the method 28 may further include, when in the operational mode, the battery powered wireless sensor repeatedly wirelessly transmitting a supervisory signal to the security panel at a regular interval, and the security panel responding to each of the supervisory signals that are received and recognized by the security panel by transmitting a corresponding acknowledgement signal, as indicated at block 50. The supervisory signal may be used to monitor whether the battery powered wireless sensor remains online and in communication with the security panel. In some instances, the method 28 may further include, when in the operational mode, and in response to the security panel not receiving two or more consecutive supervisory signal from the battery powered wireless sensor, the security panel may send a command to the battery powered wireless sensor to increase the power level at which the battery powered wireless sensor transmits wireless communication signals to the security panel, as indicated at block 52. In some instances, the method 28 may further include, when in the operational mode, and in response to the battery powered wireless sensor not receiving one or more acknowledgement signals from the security panel, the battery powered wireless sensor may automatically increase the power level at which the battery powered wireless sensor transmits wireless communication signals to the security panel, as indicated at block 54. This may be repeated until the battery powered wireless sensor receives an acknowledgement signal from the security panel.

Continuing on FIG. 2C, the method 28 may further include taking additional steps when in the operational mode, as indicated at block 56. The additional steps may include the battery powered wireless sensor decreasing the power level at which the battery powered wireless sensor transmits wireless communication signals to the security panel, as indicated at block 58. The additional steps may include, after decreasing the power level at which the battery powered wireless sensor transmits wireless communication signals to the security panel, determining whether the battery powered wireless sensor is not receiving one or more acknowledgement signals from the security panel, and if not, increasing the power level at which the battery powered wireless sensor transmits wireless communication signals to the security panel, as indicated at block 60. Using this process, the battery powered wireless sensor may automatically adapt the power level at which the battery powered wireless sensor transmits wireless communication signals to the security panel to achieve and maintain a minimum power level while still achieving reliable communication with the security panel.

Figure 3:
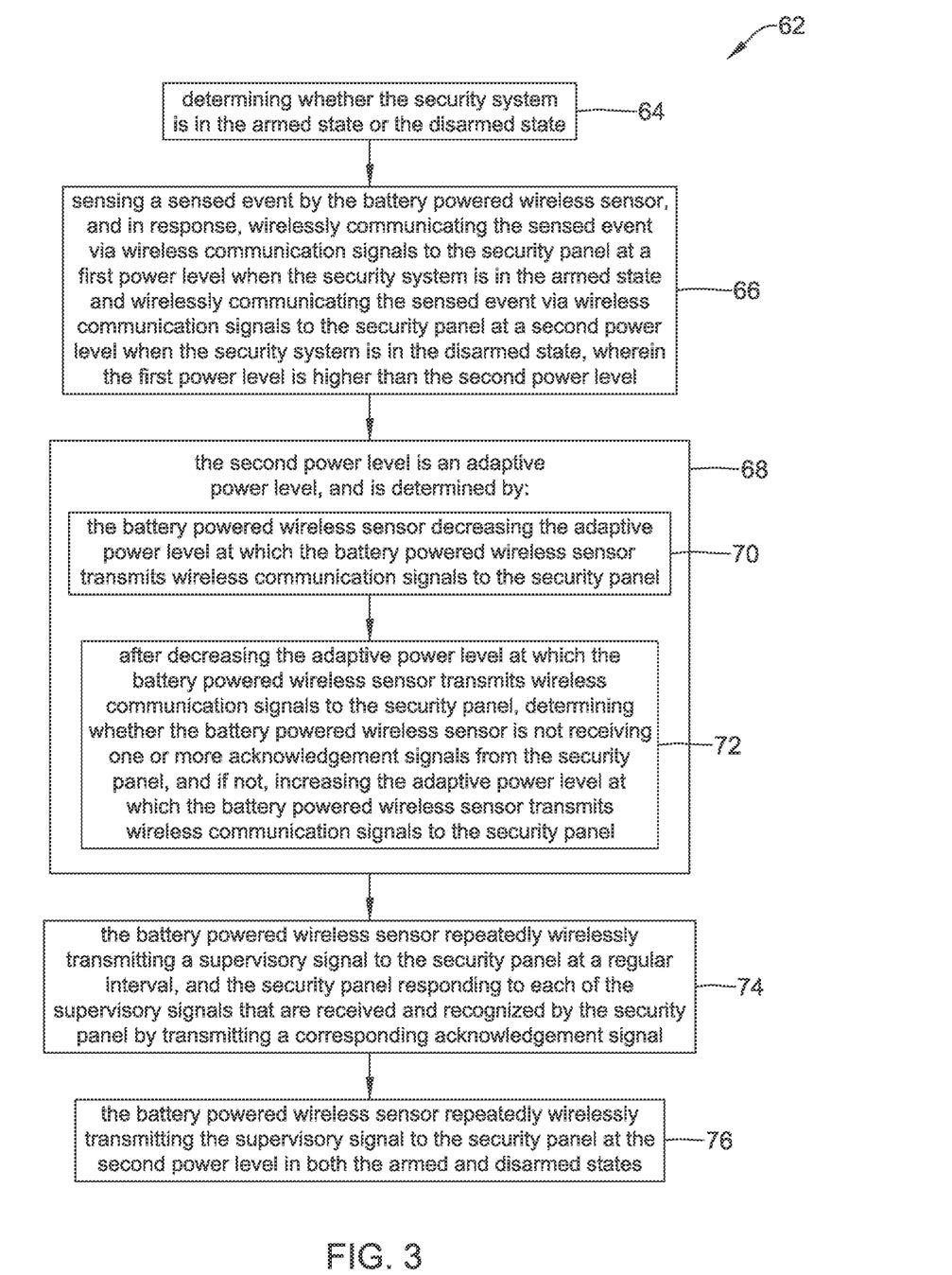
FIG. 3 is a flow diagram showing an illustrative method for operating a security system including a battery powered wireless sensor communicating with a security panel.

FIG. 3 is a flow diagram showing an illustrative method 62 for operating a security system (such as the security system 10) that includes a battery powered wireless sensor (such as the battery powered wireless sensors 14) in communication with a security panel (such as the security panel 12). The battery powered wireless sensor sensing for a sensed event, and when sensed, the battery powered wireless sensor wirelessly communicating the sensed event via wireless communication signals to the security panel. The security system having an armed state and a disarmed state. The method includes determining whether the security system is in the armed state or the disarmed state, as indicated at block 64. A sensed event is sensed by the battery powered wireless sensor, and in response, the sensed event is wireless communicated via wireless communication signals to the security panel at a first power level when the security system is in the armed state and the sensed event is wirelessly communicated via wireless communication signals to the security panel at a second power level when the security system is in the disarmed state, wherein the first power level is higher than the second power level, as indicated at block 66.

In some cases, the second power level may be an adaptive power level and the first power level may be a fixed power level, as indicated at block 68. The adaptive power level may be determined by the battery powered wireless sensor decreasing the adaptive power level at which the battery powered wireless sensor transmits wireless communication signals to the security panel, as indicated at block 70. The adaptive power level may be determined by, after decreasing the adaptive power level at which the battery powered wireless sensor transmits wireless communication signals to the security panel, determining whether the battery powered wireless sensor is not receiving one or more acknowledgement signals from the security panel, and if not, increasing the adaptive power level at which the battery powered wireless sensor transmits wireless communication signals to the security panel, as indicated at block 72.

In some instances, the method 62 may include the battery powered wireless sensor repeatedly wirelessly transmitting a supervisory signal to the security panel at a regular interval, and the security panel responding to each of the supervisory signals that are received and recognized by the security panel by transmitting a corresponding acknowledgement signal, as indicated at block 74. The method 62 may include the battery powered wireless sensor repeatedly wirelessly transmitting the supervisory signal to the security panel at the second power level in both the armed and disarmed states, as indicated at block 76. In some instances, the battery powered wireless sensor may be a motion sensor. In some instances, the battery powered wireless sensor may be a smoke sensor. These are just examples.

Figure 4:
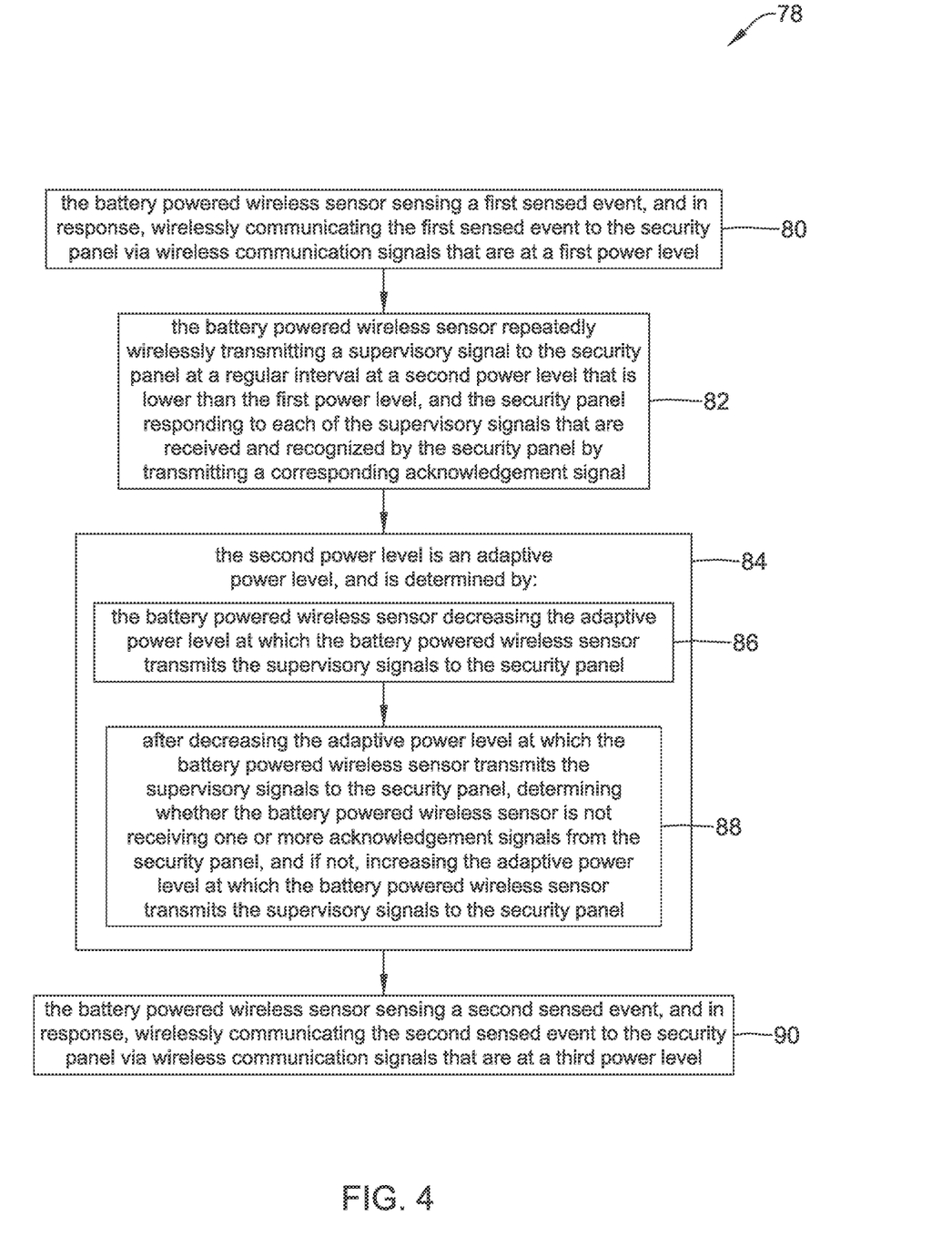
FIG. 4 is a flow diagram showing an illustrative method for operating a security system including a battery powered wireless sensor communicating with a security panel.

FIG. 4 is a flow diagram showing an illustrative method 78 for operating a security system (such as the security system 10) that includes a battery powered wireless sensor (such as the battery powered wireless sensors 14) in communication with a security panel. The method includes the battery powered wireless sensor sensing a first sensed event, and in response, wirelessly communicating the first sensed event to the security panel via wireless communication signals that are at a first power level, as indicated at block 80. The battery powered wireless sensor repeatedly wirelessly transmits a supervisory signal to the security panel at a regular interval at a second power level that is lower than the first power level, and the security panel responding to each of the supervisory signals that are received and recognized by the security panel by transmitting a corresponding acknowledgement signal, as indicated at block 82.

In some instances, the second power level may be an adaptive power level and the first power level may be a fixed power level. In some instances, the second power level may be an adaptive power level, as indicated at block 84. The adaptive power level may be determined by the battery powered wireless sensor decreasing the adaptive power level at which the battery powered wireless sensor transmits the supervisory signals to the security panel, as indicated at block 86. The adaptive power level may be determined by, after decreasing the adaptive power level at which the battery powered wireless sensor transmits the supervisory signals to the security panel, determining whether the battery powered wireless sensor is not receiving one or more acknowledgement signals from the security panel, and if not, increasing the adaptive power level at which the battery powered wireless sensor transmits the supervisory signals to the security panel, as indicated at block 88.

In some instances, the method 78 may include the battery powered wireless sensor sensing a second sensed event, and in response, wirelessly communicating the second sensed event to the security panel via wireless communication signals that are at a third power level, as indicated at block 90. In some instances, the third power level may be different from the first power level and the second power level. In some instances, the second sensed event may be of a different event type that has a different event priority than the first sensed event.

Figure 5:
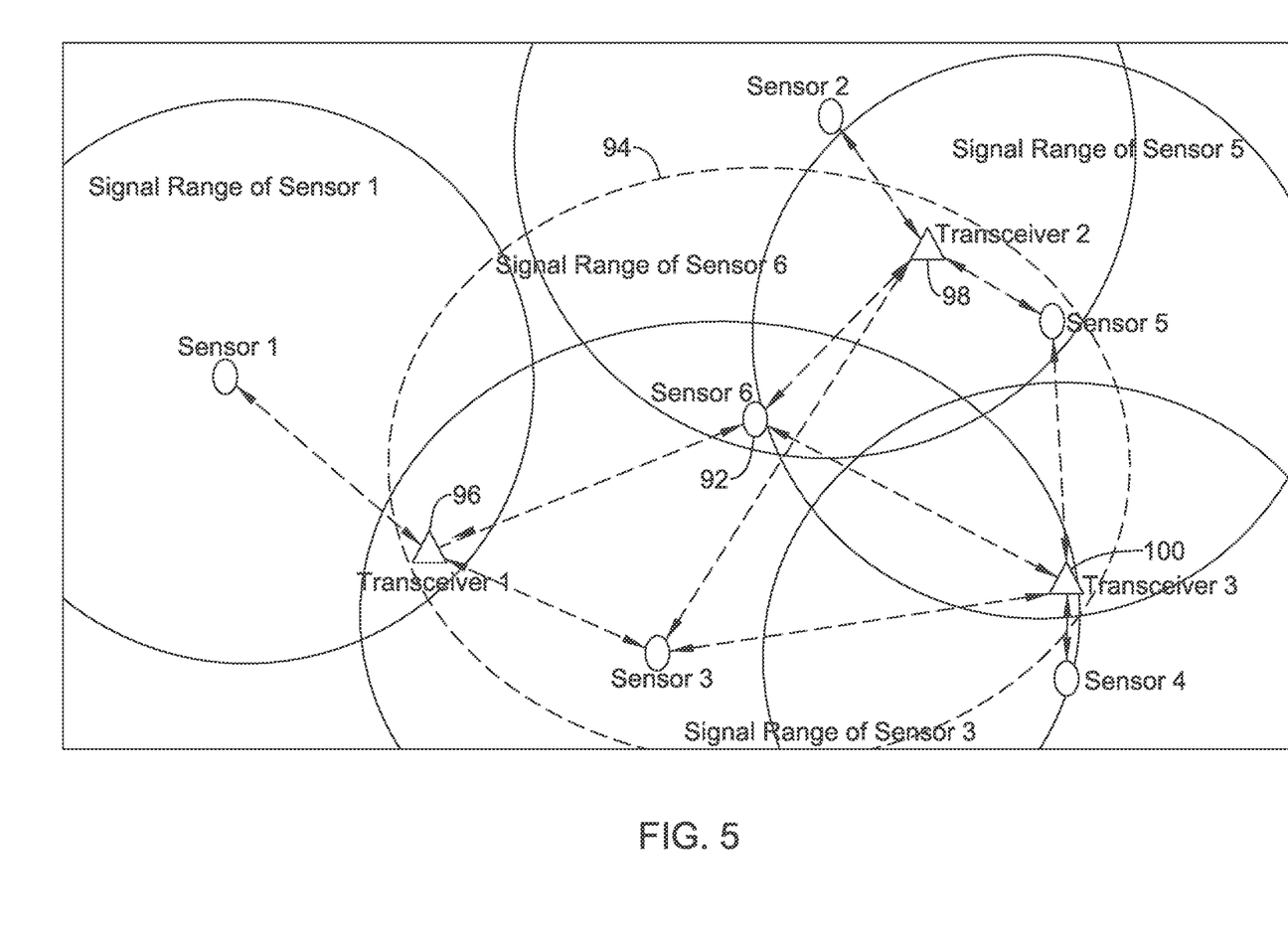
FIG. 5 is a schematic drawing showing results of battery powered wireless sensors communicating at full power.
Figure 6:
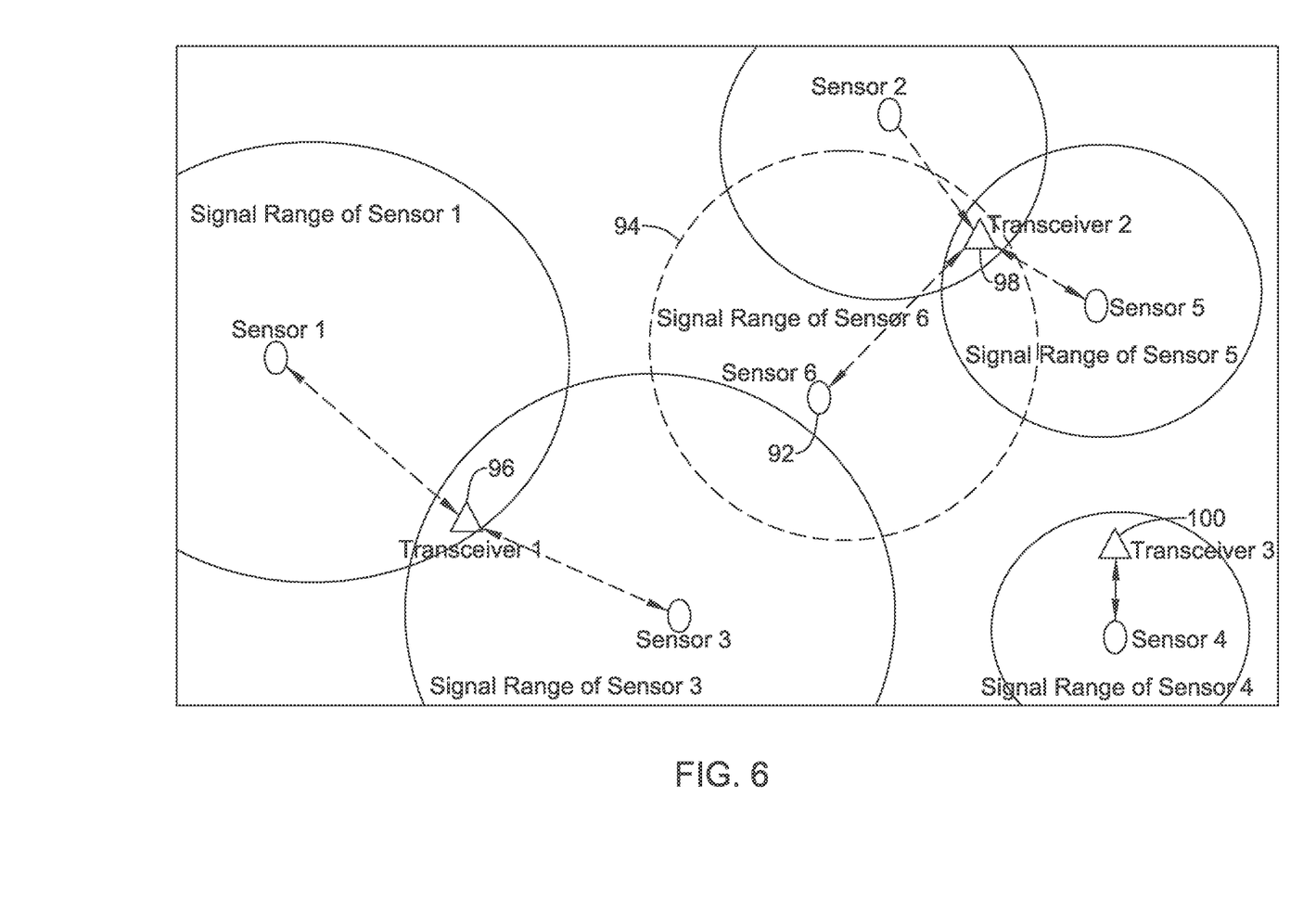
FIG. 6 is a schematic drawing show results of battery powered wireless sensors communicating at adaptive power levels.

FIG. 5 is a schematic view of the relative signal ranges of several sensors when the sensors are transmitting at a full power level, while FIG. 6 shows the relative signal ranges when transmitting at reduced power levels. Looking for example at a sensor 92 (labeled as sensor 6), the sensor 92 has a signal range that is indicated by a circle 94. At full power as shown in FIG. 5, the sensor 92 is able to reach a transceiver 96 (labeled as Transceiver 1), a transceiver 98 (labeled as Transceiver 2) and a transceiver 100 (labeled as Transceiver 2). In some cases, transceiver 96, transceiver 98 and transceiver 100 may each correspond to a different security panel, but this is not required. At a reduced power level (as shown in FIG. 6), the sensor 92 is only able to reach the transceiver 98 (labeled as Transceiver 2). This means that the sensor 92 is no longer competing with sensor 1 and sensor 3 when sensor 1 and sensor 3 are attempting to communicate with the transceiver 96 (labeled as Transceiver 1) or with sensor 4 when sensor 4 is attempting to communicate with the transceiver 100 (labeled as Transceiver 3). Similar comparisons may be made with the relative signal ranges of the other sensors, when comparing FIG. 5 and FIG. 6. Being able to successfully transmit at lower power levels not only conserves battery power for the respective battery powered wireless sensor, but also means that there may be reduced signal congestion across the system.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for configuring a transmit power level of a battery powered wireless sensor of a security system, the method comprising:
    entering a walk-test mode for at least part of the security system, and once in the walk-test mode:
        the battery powered wireless sensor transmitting a plurality of wireless communication signals each at a different transmit power level, and for each of the plurality of wireless communication signals, listening for a corresponding wireless acknowledgement signal;
        a security panel of the security system:
            listening for the plurality of wireless communication signals transmitted by the battery powered wireless sensor;
            attenuating the plurality of wireless communication signals by a predetermined margin; and
            transmitting a wireless acknowledgement signal to the battery powered wireless sensor for those attenuated wireless communication signals that are received and recognized by the security panel;
        the battery powered wireless sensor determining a minimum transmit power level based at least in part on which of the plurality of wireless communication signals that were transmitted by the battery powered wireless sensor at the different transmit power level resulted in a corresponding wireless acknowledgement signal from the security panel, and which of the plurality of wireless communication signals did not result in a corresponding wireless acknowledgement signal;
    exiting the walk-test mode and entering an operational mode, and once in the operational mode:
        the battery powered wireless sensor transmitting wireless communication signals to the security panel using the determined minimum transmit power level; and
        the security panel of the security system no longer attenuating the wireless communication signals transmitted by the battery powered wireless sensor.

2. The method of claim 1, wherein in the operational mode:
    the battery powered wireless sensor repeatedly wirelessly transmitting a supervisory signal to the security panel at a regular interval, and the security panel responding to each of the supervisory signals that are received and recognized by the security panel by transmitting a corresponding acknowledgement signal.

3. The method of claim 2, wherein in the operational mode:
in response to the security panel not receiving two or more consecutive supervisory signal from the battery powered wireless sensor, the security panel sending a command to the battery powered wireless sensor to increase the power level at which the battery powered wireless sensor transmits wireless communication signals to the security panel.

4. The method of claim 2, wherein in the operational mode:
in response to the battery powered wireless sensor not receiving one or more acknowledgement signals from the security panel, the battery powered wireless sensor increasing the power level at which the battery powered wireless sensor transmits wireless communication signals to the security panel.

5. The method of claim 4, wherein in the operational mode:
the battery powered wireless sensor decreasing the power level at which the battery powered wireless sensor transmits wireless communication signals to the security panel; and
after decreasing the power level at which the battery powered wireless sensor transmits wireless communication signals to the security panel, determining whether the battery powered wireless sensor is not receiving one or more acknowledgement signals from the security panel, and if not, increasing the power level at which the battery powered wireless sensor transmits wireless communication signals to the security panel.

6. The method of claim 1, wherein attenuating the wireless communication signals transmitted by the battery powered wireless sensor by the predetermined margin comprises activating a hardware attenuator of the security panel.

7. The method of claim 1, wherein attenuating the wireless communication signals transmitted by the battery powered wireless sensor by the predetermined margin comprises activating a software attenuator of the security panel.

8. The method of claim 6, wherein the predetermined margin is within a range of 5 to 15 decibels.

9. A method for operating a security system that includes a battery powered wireless sensor in communication with a security panel, the battery powered wireless sensor sensing for a sensed event, and when sensed, wirelessly communicating the sensed event via wireless communication signals to the security panel, the security system having an armed state and a disarmed state, the method comprising:
determining whether the security system is in the armed state or the disarmed state; and
sensing a sensed event by the battery powered wireless sensor, and in response, wirelessly communicating the sensed event via wireless communication signals to the security panel at a first power level when the security system is in the armed state and wirelessly communicating the sensed event via wireless communication signals to the security panel at a second power level when the security system is in the disarmed state, wherein the first power level is higher than the second power level.

10. The method of claim 9, wherein the second power level is an adaptive power level and the first power level is a fixed power level.

11. The method of claim 9, wherein the second power level is an adaptive power level, wherein the adaptive power level is determined by:
the battery powered wireless sensor decreasing the adaptive power level at which the battery powered wireless sensor transmits wireless communication signals to the security panel; and
after decreasing the adaptive power level at which the battery powered wireless sensor transmits wireless communication signals to the security panel, determining whether the battery powered wireless sensor is not receiving one or more acknowledgement signals from the security panel, and if not, increasing the adaptive power level at which the battery powered wireless sensor transmits wireless communication signals to the security panel.

12. The method of claim 9, wherein:
the battery powered wireless sensor repeatedly wirelessly transmitting a supervisory signal to the security panel at a regular interval, and the security panel responding to each of the supervisory signals that are received and recognized by the security panel by transmitting a corresponding acknowledgement signal; and
the battery powered wireless sensor repeatedly wirelessly transmitting the supervisory signal to the security panel at the second power level in both the armed and disarmed states.

13. The method of claim 9, wherein the battery powered wireless sensor comprises a motion sensor.

14. The method of claim 9, wherein the battery powered wireless sensor comprises a smoke sensor.

15. A method for operating a security system that includes a battery powered wireless sensor in communication with a security panel, the method comprising:
the battery powered wireless sensor sensing a first sensed event, and in response, wirelessly communicating the first sensed event to the security panel via wireless communication signals that are at a first power level;
the battery powered wireless sensor repeatedly wirelessly transmitting a supervisory signal to the security panel at a regular interval at a second power level that is lower than the first power level, and the security panel responding to each of the supervisory signals that are received and recognized by the security panel by transmitting a corresponding acknowledgement signal;
wherein the second power level is an adaptive power level, wherein the adaptive power level is determined by:
the battery powered wireless sensor decreasing the adaptive power level at which the battery powered wireless sensor transmits the supervisory signals to the security panel; and
after decreasing the adaptive power level at which the battery powered wireless sensor transmits the supervisory signals to the security panel, determining whether the battery powered wireless sensor is not receiving one or more acknowledgement signals from the security panel, and if not, increasing the adaptive power level at which the battery powered wireless sensor transmits the supervisory signals to the security panel.

16. The method of claim 15, wherein the first power level is a fixed power level.

17. The method of claim 15, comprising the battery powered wireless sensor sensing a second sensed event, and in response, wirelessly communicating the second sensed event to the security panel via wireless communication signals that are at a third power level.

18. The method of claim 17, wherein the third power level is different from the first power level and the second power level.

19. The method of claim 18, wherein the second sensed event is of a different event type that has a different event priority than the first sensed event.

* * * * *